(12) United States Patent
Uemura et al.

(10) Patent No.: US 7,152,704 B2
(45) Date of Patent: Dec. 26, 2006

(54) FOUR-WHEEL DRIVE WORK VEHICLE

(75) Inventors: Katsuhiko Uemura, Sakai (JP);
Hiroyuki Ogasawara, Sakai (JP);
Hiroki Nagai, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/823,532

(22) Filed: Apr. 13, 2004

(65) Prior Publication Data

US 2005/0011684 A1 Jan. 20, 2005

(30) Foreign Application Priority Data

Jun. 26, 2003 (JP) .............................. 2003-182994
Mar. 19, 2004 (JP) .............................. 2004-079763

(51) Int. Cl.
*B60K 17/34* (2006.01)
*B64C 13/30* (2006.01)
*F16C 1/22* (2006.01)

(52) U.S. Cl. .................... 180/6.24; 180/247; 180/6.32; 180/6.34; 180/6.4; 180/6.26; 192/87.21; 74/501.5 R; 74/502.4; 74/502.6; 74/567; 74/569

(58) Field of Classification Search ........... 74/501.5 R, 74/502.4, 502.6, 567, 569; 192/87.21; 180/247, 180/6.32, 6.34, 6.4, 6.26

See application file for complete search history.

(56) References Cited

U.S. PATENT DOCUMENTS

| | | | | |
|---|---|---|---|---|
| 1,785,738 A | * | 12/1930 | Knox et al. ................. | 180/6.34 |
| 4,930,296 A | | 6/1990 | Takei et al. | |
| 5,341,893 A | * | 8/1994 | Fukui et al. ................. | 180/245 |
| 6,904,985 B1 | * | 6/2005 | Ferree et al. ............... | 180/6.32 |
| 6,962,219 B1 | * | 11/2005 | Hauser ........................ | 180/6.34 |
| 2003/0067212 A1 | | 4/2003 | Samejima et al. | |
| 2003/0106296 A1 | | 6/2003 | Ishimori | |

FOREIGN PATENT DOCUMENTS

| | | |
|---|---|---|
| JP | 58043864 A | 3/1983 |
| JP | 60193779 A | 10/1985 |
| JP | 2000-053032 | 2/2000 |
| JP | 2003-106412 | 4/2003 |
| JP | 2003-170859 | 6/2003 |

\* cited by examiner

*Primary Examiner*—Lesley D. Morris
*Assistant Examiner*—Marlon Arce-Diaz
(74) *Attorney, Agent, or Firm*—The Webb Law Firm

(57) ABSTRACT

A four-wheel drive work vehicle includes an engine, a pair of right and left steerable wheels rotatably driven by receiving power from the engine via a differential mechanism, a pair of right and left non-steerable wheels rotatably driven by receiving power from the engine via right and left side clutches and a pivotal cam mechanism for operating a clutch operating member for controlling the side clutch based on a steered displacement of the steerable wheels. The pivotal cam mechanism includes a cam member which is displaced based on the steered displacement and a cam follower member operably associated with the cam member. The clutch operating member is displaced via the pivotal cam mechanism by a predetermined amount in response to a steering operation of the steerable wheels by an angle exceeding a predetermined angle from a straight traveling condition and in association with the displacement of the clutch operating member by the predetermined amount, one side clutch for one of the non-steerable wheels located on the inner side of the vehicle turn is automatically disengaged against an engaging urging force.

15 Claims, 15 Drawing Sheets

FOUR-WHEEL DRIVE WORK VEHICLE

BACKGROUND OF THE INVENTION

1. Field of the Invention

The present invention relates to a four-wheel drive work vehicle including a pair of right and left front wheels rotatably driven by receiving power from an engine via a differential mechanism and a pair of right and left non-steerable rear wheels rotatably driven by receiving power from the engine via right and left side clutches, the side clutches being operated by a clutch operating member which is controlled based on a steered displacement of the front wheels.

2. Description of the Related Art

With a four-wheel drive lawn mower, in general, the right and left front wheels as steerable wheels are driven via a differential mechanism whereas the rear wheels as non-steerable wheels are driven via a differential mechanism having a differential lock function (see e.g. Japanese Patent Application "Kokai" No.: 2003-106412). Further, the convention has also proposed a construction which provides side brakes for allowing independent braking of right and left rear wheels which are driven via the differential mechanism (see e.g. Japanese Patent Application "Kokai" No.: 2000-53032).

With the former type of construction which drives both the front and rear wheels via respective differential mechanisms, a speed difference is provided between the inner-side wheels and outer-side wheels according to a steered amount of the vehicle. Hence, this construction is advantageous in permitting reliable and smooth vehicle steering with the four-wheel drive. This construction, however, is disadvantageous in that the minimum turning radius of the vehicle tends to be relatively large, which presents difficulty in an operation on a limited lawn-covered land or a land having a complicated ground contour. On the other hand, with the latter type of construction having side brakes for the right and left rear wheels, a small-radius (sharp) turn is made possible by applying, when needed, a braking force to one rear wheel which is located on the inner side of that turn. Hence, this construction is advantageous in that such operation on a limited lawn-covered land or a land having a complicated ground contour can be done very easily.

However, when the vehicle effects a small turn by applying a braking force to the inner side rear wheel with the side brake, there occurs a forcible "dragging" displacement of the rear wheel locked by the side brake, which displacement tends to roughen up the traveling ground or damage the lawn in the case of a lawn mower vehicle. If the vehicle is constructed as a rice planting machine, such small turn roughens the land at the ridge end of the field where the turn is effected.

In order to solve this problem, from Japanese Patent Application "Kokai" No.: 2003-170859, there is known a further construction wherein the right and left steerable front wheels are driven via a differential mechanism whereas the non-steerable rear wheels are driven via respective side clutches and the side clutches and a steering mechanism are mechanically coupled to each other so that the side clutch for the rear wheel on the inner side of the turn is automatically disengaged for rendering this rear wheel freely rotatable in response to a steering operation of the front wheels by an angle exceeding a predetermined angle from the straight traveling condition. With this construction, since the inner rear wheel is rendered freely rotatable, there occurs no dragging displacement in the rear wheel which would otherwise occur in its locked condition and the small turn can be effected relatively easily, while not roughening the traveling ground much. This steering construction configured to automatically disengage the side clutch for the rear wheel on the inner side of the turn allows even an inexperienced or unskilled operator to effect the small turn with three wheel drive mode relatively easily by simply turning the steering wheel. This is a significant advantage in practical terms. This construction, however, has a structural difficulty as follows. Namely, with this conventional construction, when the front wheels (steerable wheels) are steered by an angle beyond the predetermined angle, a clutch lever for operating the side clutch for the inner side rear wheel is operated to a clutch disengaging position. For further steering operation subsequent to the side clutch disengagement, a "stroke absorbing" compression spring incorporated in a link mechanism for clutch operation is elastically deformed so as to prevent the clutch lever from being operated more than necessary. In this case, the stroke absorbing spring is compressed in advance so as to allow the clutch lever to be disengaged against an engaging urging force for the side clutch. Hence, the stroke absorbing operation requires further or additional compression deformation of this compression spring. For this reason, in the case of this conventional construction, after the steering wheel is operated to an operational range sufficient to disengage the side clutch, the operational load for further operating the steering wheel is progressively increased. If the vehicle has no power steering function, this provides a heavy operational feel to the operator in the steering operation.

SUMMARY OF THE INVENTION

The present invention has been made in view of the above-described state of the art. Hence, the primary object of the invention is to provide an improved construction which retains the advantage of allowing an easy and smooth small turn by automatic disengagement of a side clutch and which also allows an operator to effect a steering operation for the small turn with a light operational feel.

For accomplishing the above object, the invention proposes a four-wheel drive work vehicle comprising: an engine; a pair of right and left steerable wheels rotatably driven by receiving power from the engine via a differential mechanism; a pair of right and left non-steerable wheels rotatably driven by receiving power from the engine via right and left side clutches; a displacement converter mechanism for converting a steered displacement of the steerable wheels into a different mode of displacement; a clutch operating member for operating one of the side clutches based on said different mode displacement converted by the displacement converter mechanism; wherein said displacement converter mechanism comprises a pivotal cam mechanism including a cam member which is displaced based on said steered displacement and a cam follower member operably associated with said cam member; and for a vehicle turn, said clutch operating member is displaced via said pivotal cam mechanism by a predetermined amount in response to a steering operation of the steerable wheels by an angle exceeding a predetermined angle from a straight traveling condition and in association with said displacement of the clutch operating member by said predetermined amount, said one side clutch for one of the non-steerable wheels located on the inner side of said vehicle turn is automatically disengaged against an engaging urging force.

With the above-described construction, when the vehicle travels straight or makes a gentle (not small or sharp) turn where the steerable wheels are steered by an angle short of the predetermined angle, both of the right and left side clutches are maintained under "clutch-engaged" condition, so that the right and left non-steerable wheels are driven at a same peripheral speed.

On the other hand, when the steerable wheels are steered by an angle exceeding or greater than the predetermined angle, in response to this steered displacement of the steerable wheels, the pivotal cam mechanism is activated, so that the clutch operating member is pivotally operated by the predetermined angle. With this, only one side clutch for the non-steerable wheel located on the inner side of that turn is automatically disengaged, so that the vehicle makes a turn to the steered direction of the steerable wheels in the three-wheel drive mode involving the steered right and left steerable wheels and the other non-steerable wheel located on the outer side of the turn. In this, in the side clutch disengaging operational range where the steerable wheels have been steered by the angle greater than the predetermined angle, the clutch operating member is operated only by the amount needed for the clutch disengaging operation. This avoids the progressive increase in the operational load with advance in the steering operation.

Therefore, the invention has achieved the intended object of providing an improved construction which retains the advantage of allowing an easy and smooth small turn by automatic disengagement of a side clutch and which also allows an operator to effect a steering operation for the small turn with a light operational feel.

According to one proposal made by the invention regarding the specific construction of the pivotal cam mechanism, said cam member of the pivotal cam mechanism comprises a sector gear pivotable back and forth in response to a steering operation of a steering wheel, said cam follower member of the pivotal cam mechanism comprises a pivot arm which comes into contact with a contact member provided to said sector gear, and said pivot arm includes a first arm portion operable by said contact member in response to a steering operation to the left and a second arm portion operable by said contact member in response to a steering operation to the right. In this case, the first arm portion and the second arm portion can be formed integral. This construction achieves simplification of the cam follower of the pivotal cam mechanism.

Further, the first arm portion and the second arm portion can be configured to be displaced independently of each other. This renders the operating line for the right side clutch independent of the operating line for the left side clutch. Hence, this construction can eliminate a "play" means in the form of e.g. a stroke absorbing slot for preventing an operation on one line from affecting an operation on the other. Therefore, it is possible to avoid such inconvenience as clogging of the slot with a foreign object or instability of operation associated with such play mean. Thus, a constantly smooth operation can be assured.

According to another preferred invention's construction for the pivotal cam mechanism, said cam follower member of the pivotal cam mechanism comprises a pivotal cam plate having a cam face in its outer periphery, said cam member of the pivotal cam mechanism comprises a pivot member which comes into contact with said cam face, and said pivotal cam mechanism is incorporated in a transmission case accommodating said side clutches. This construction provides an additional advantage as follows. Namely, when the steerable wheels are being steered from the straight traveling condition by an angle not greater than the predetermined angle, a play is needed for preventing transmission of a clutch disengaging force to the side clutch for the inner side of the turn and a further play is needed for preventing transmission of a reverse operating force to the other side clutch for the non-steerable wheel on the outer side of the turn. In this respect, according to the above-proposed construction, such plays can be easily designed as a particular shape of the cam face to be formed in the outer periphery of the pivotal cam plate of the pivotal cam mechanism. Moreover, as this cam face is formed in the outer periphery of the cam plate, any dust or dirt adhering to the cam face can be easily removed through its contact with the pivot member movable relative to this cam face. Furthermore, as the pivotal cam mechanism having the play function for absorbing stroke is incorporated in the transmission case, the necessary operative connection between the pivotal cam mechanism and the steering mechanism can be easily realized by simply interconnecting these mechanism without any intervention of a link member or any mechanical looseness therebetween. Such "tight" or proximal interconnection is advantageous for avoiding trouble due to adhesion of dust or dirt thereto.

Preferably, the pivotal cam plate of the pivotal cam mechanism is attached to a portion of an operational shaft attached to and extending through said transmission case, said shaft portion projecting from the case, and said clutch operating member is attached to a further portion of the shaft disposed inside the transmission case. With this construction, when the steerable wheels are steered by an angle greater than the predetermined angle, the pivot member is moved relative to the pivotal cam plate, whereby only the one pivotal cam plate corresponding to the side clutch for the non-steerable wheel located on the inner side of the turn is pivotally operated. Hence, the clutch operating member integrated with this pivotal cam plate via the operational shaft is pivoted inside the transmission case for disengaging the one side clutch for the inner side of the turn.

Further, said pivotal cam plate can include a stable cam face portion formed in the cam face for maintaining the side cutch at a predetermined clutch disengaging condition in response to a further steering operation of the steerable wheels after the clutch disengagement. With this, in the side clutch disengaging operational range where the steerable wheels have been steered by the angle greater than the predetermined angle, the side clutch on the inner side of the turn spring-urged in the clutch engaging direction is operated only by the amount needed for the clutch disengaging operation. This avoids the progressive increase in the operational load when the steerable wheels are further steered after the side clutch disengagement.

The operational shaft can be attached to the transmission case such that the shaft extends through the case in the fore and aft direction. With this, the cam face formed in the outer periphery of the pivotal cam plate of the pivotal cam mechanism can be arranged with a lateral or downward orientation advantageous for restricting adhesion or accumulation of dust or soil thereto.

Further, the four-wheel drive work vehicle can be a mower vehicle. In this case, the steering mechanism and the pivotal cam mechanism can be wire-connected to each other and a mower implement can be mounted on the vehicle body between the steerable wheels and the non-steerable wheels. With this construction, a wire connecting member such as a release wire for operably coupling the steering mechanism with the pivotal cam mechanism can be laid out along an appropriate path under the vehicle body so as not to interfere with a lifting operation of the mower implement carrying an input gear case or the like mounted on and projecting from the top face thereof.

Further features and advantages of the invention will become apparent upon reading the following detailed disclosure of preferred embodiments thereof with reference to the accompanying drawings.

DESCRIPTION OF THE PREFERRED EMBODIMENTS

Figure 1:
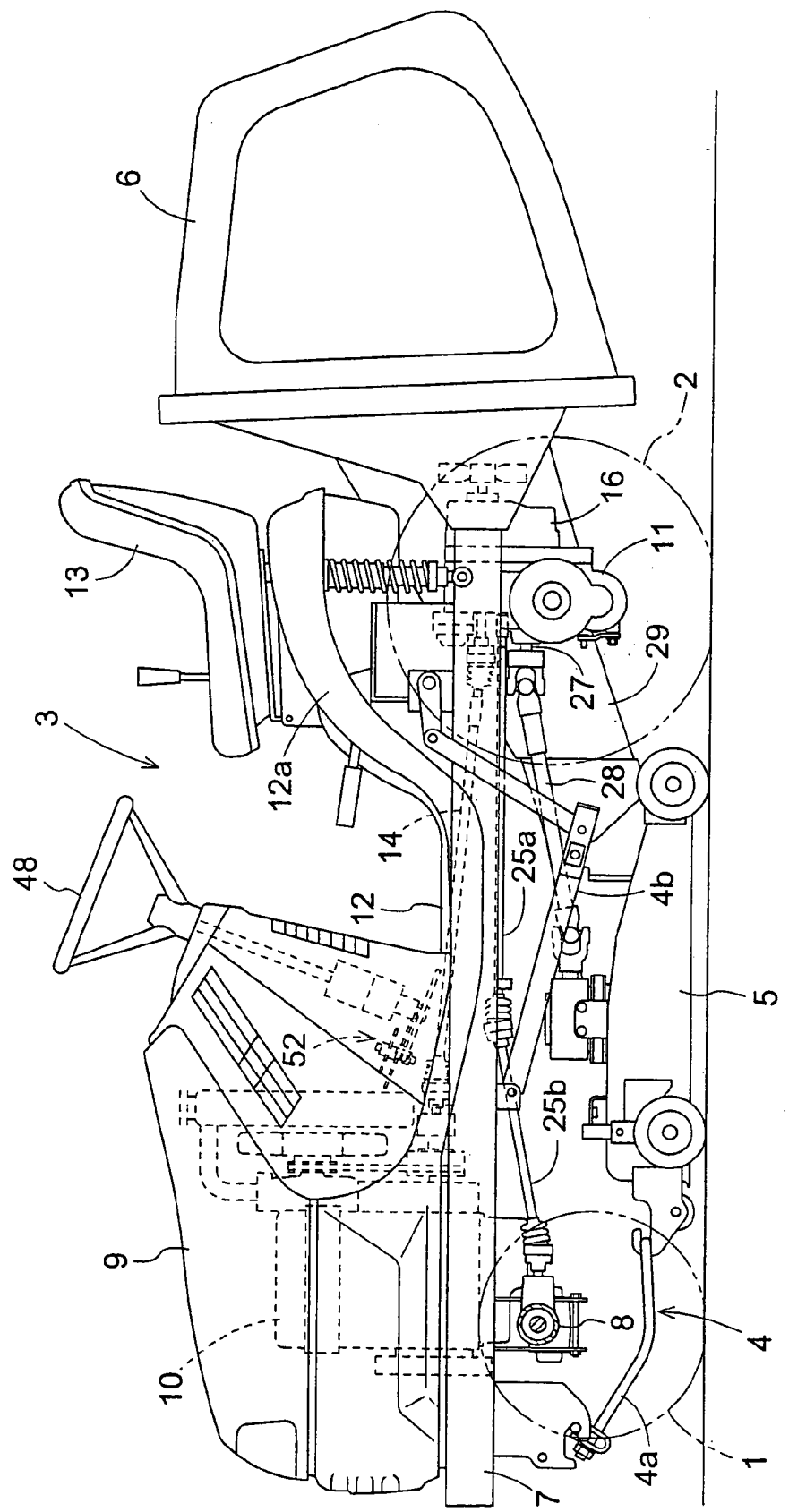
FIG. 1 is an overall side view of a passenger-driven lawn mower vehicle.

FIG. 1 is an overall side view showing a passenger-driven lawn mower vehicle as an example of a work vehicle relating to the invention. This passenger-driven lawn mower vehicle includes a passenger-driven traveling vehicle body 3 provided as a four-wheel drive type including front wheels 1 as steerable wheels and rear wheels 2 as non-steerable wheels. To the bottom of the vehicle body 3, there is suspended a mower implement 5 via a quadruple link mechanism 4 consisting of front links 4a and rear links 4b, such that the mower implement 5 can be lifted up and down. To the rear of the vehicle body, there is connected a grass collecting container 6 for collecting lawn or grass cut by the mower implement 5.

The vehicle body 3 mounts thereon a pair or right and left main frames 7. To the front of these frames 7, there is mounted a front axle case 8 steerably mounting the front wheels 1 to the right and left ends thereof, with the axle case 8 being capable of rolling movement about a fore-and-aft axis (a), and there is also mounted an engine 10 which is covered with a hood 9. To the rear of the main frames 7, there is secured a transmission case 11 mounting the right and left rear wheels 2. To the top of the main frames, there is mounted and connected a step 12, and a driver's seat 13 is disposed between right and left fender portions 12a extending continuously from the rear of the step 12.

Figure 2:
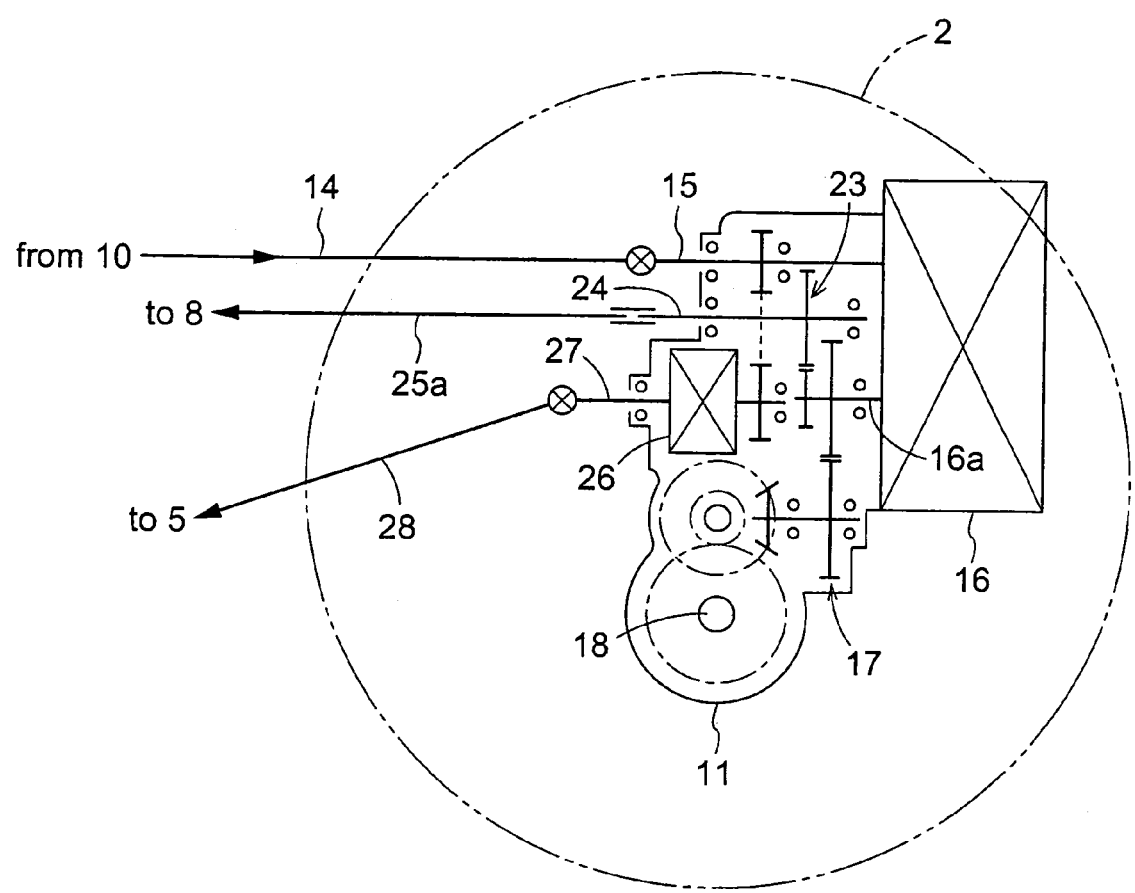
FIG. 2 is a side view schematically showing a construction of a transmission case.

As shown in FIG. 2, output or power of the engine 10 is transmitted via a transmission shaft 14 to an input shaft 15 of the transmission case 11 to be divided into a traveling power and an implement operating power. The traveling power is inputted to a hydrostatic stepless change-speed unit (HST) 16 which is connected to the rear end of the transmission case 11 and capable of switchover between a forward traveling condition and a reverse traveling condition. Then, forward (for forward traveling) or reverse (for reverse traveling) speed-changed power taken from an output shaft 16a of the HST 16 is transmitted via a gear transmission mechanism 17 to a counter shaft 18, which is operably connected to right and left rear axles 22 via right and left side clutches 19 and reduction gears 20, 21. Further, a portion of the power from the output shaft 16a of the HST 16 is transmitted via a gear transmission mechanism 23 to a front-wheel drive shaft 24. Then, the power taken from this front-wheel drive shaft 24 to the front side of the transmission case 11 is transmitted via transmission shafts 25a, 25b extending forwardly along the bottom of the vehicle body to a differential mechanism 30 incorporated within the front axle case 8. With these the front wheels 1 and the rear wheels 2 are driven at speeds associated with each other. On the other hand, the implement operating power taken off inside the transmission case 11 is taken via a PTO clutch 26 from a PTO shaft 27 mounted to the front face of the transmission case 11 and then transmitted via a transmission shaft 28 to the mower implement 5.

Figure 3:
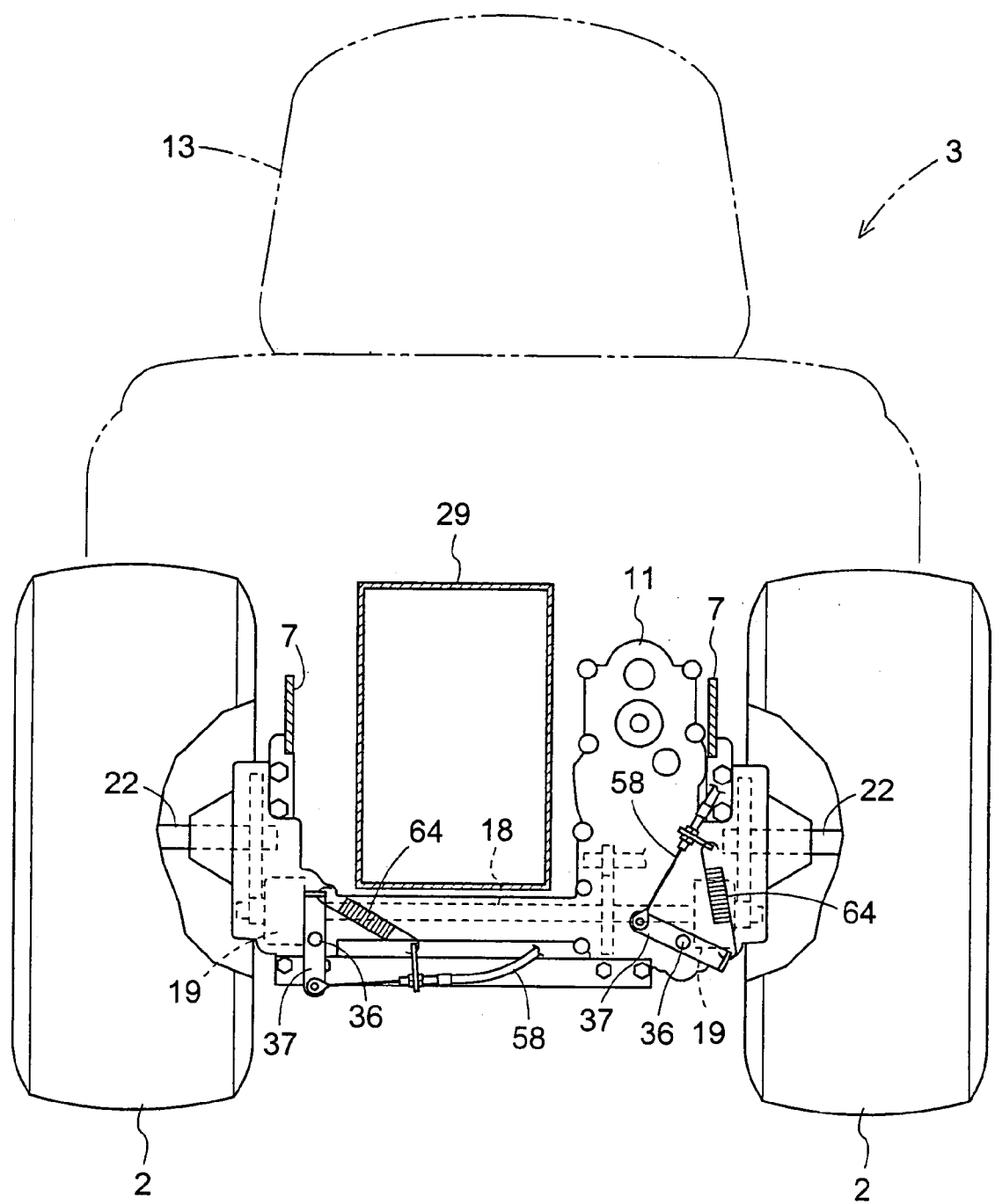
FIG. 3 is a front view of a rear transmission unit.
Figure 5:
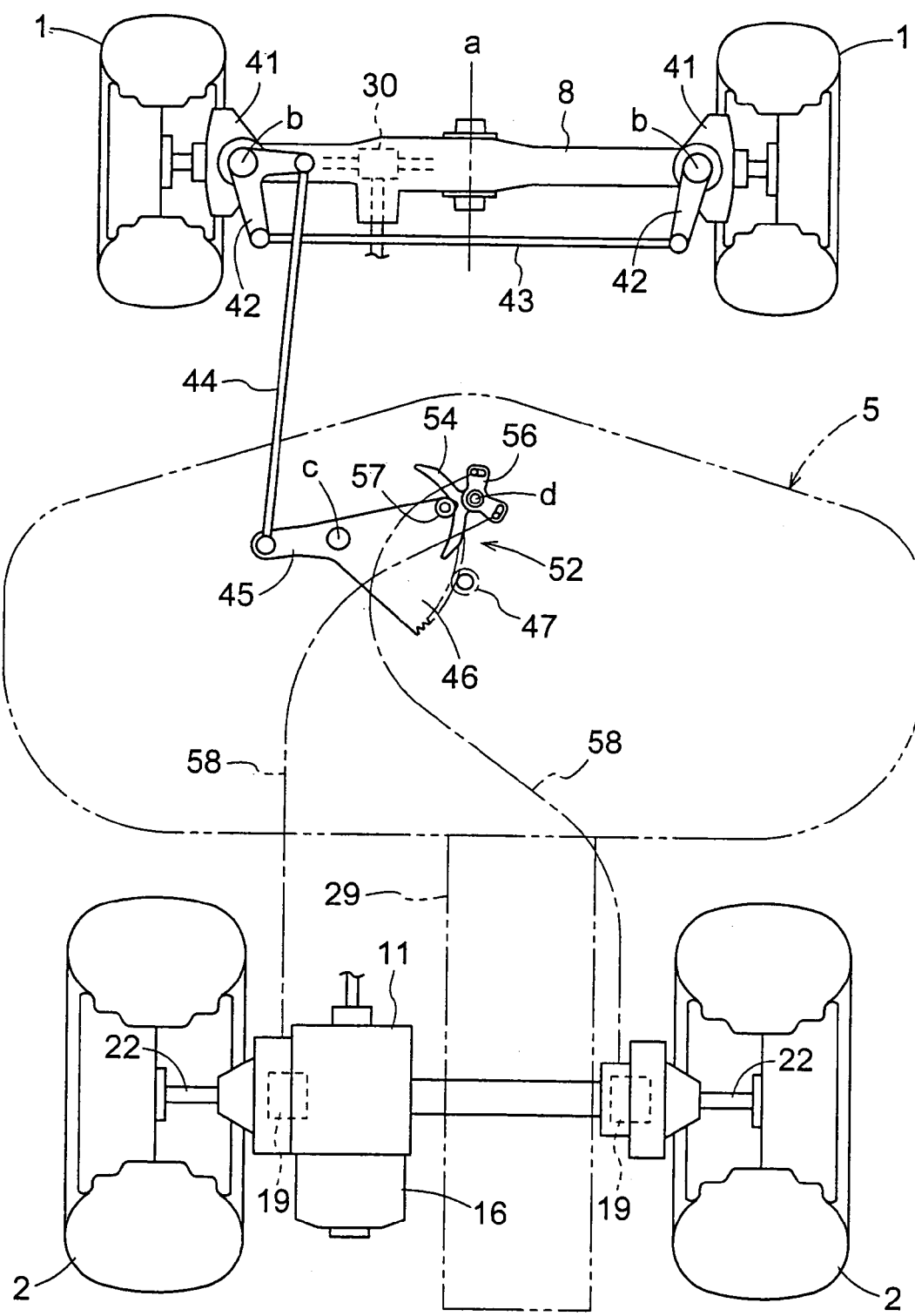
FIG. 5 is a plan view showing a steering construction under a straight traveling condition.

Incidentally, as shown in FIGS. 3 and 5, the principal portion of the transmission case 11 is arranged with an offset to the left relative to the vehicle body 3. And, in a free space downwardly of the vehicle body created by this laterally offset arrangement, there is disposed a duct 29 for guiding grass discharged from the mower implement 5 to the grass collecting container 6.

Figure 4:
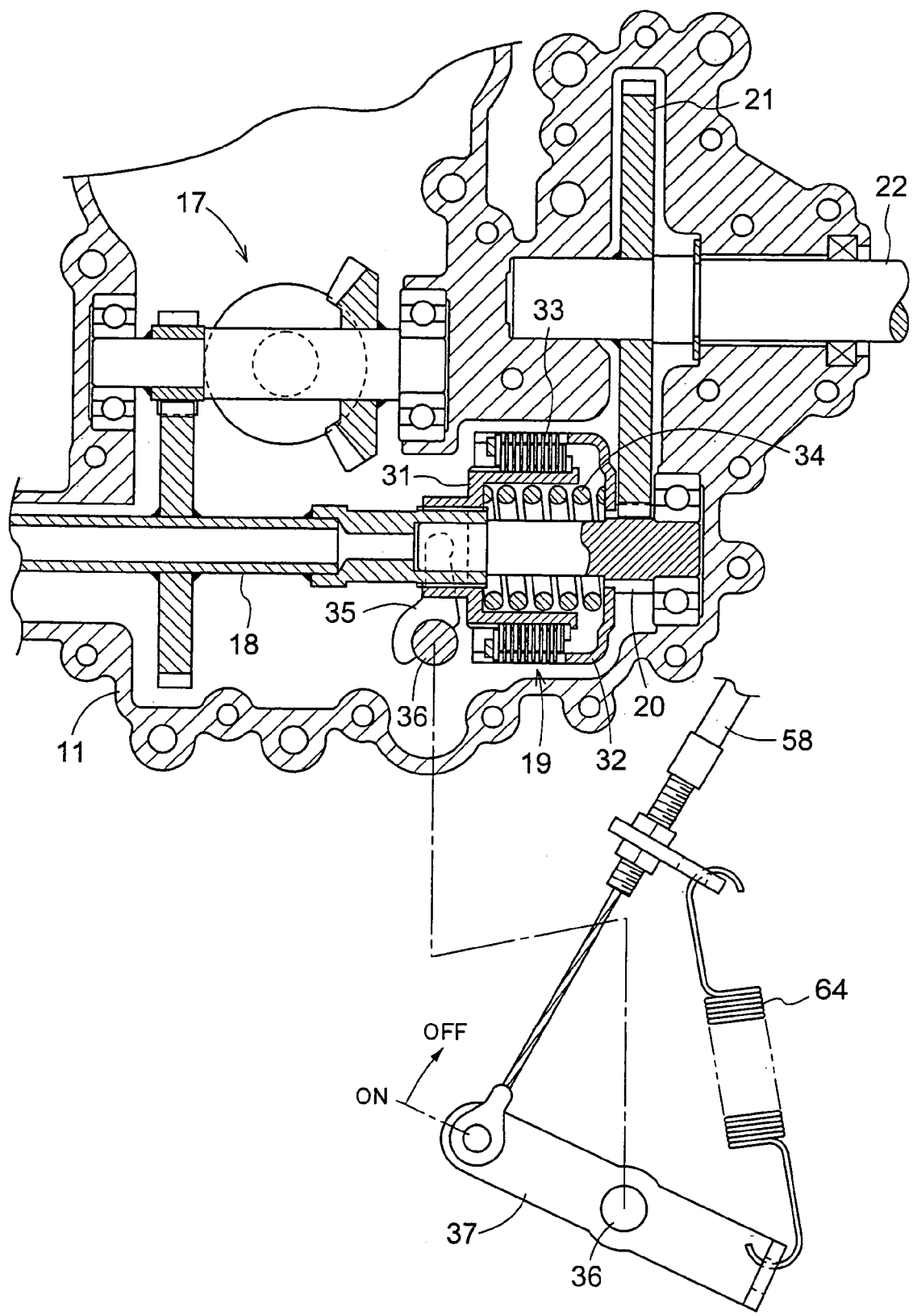
FIG. 4 is a front view showing a main portion of the transmission case and a left side clutch.

As shown in FIG. 4, the side clutch 19 is configured as a multiple disc clutch including such elements as a clutch member 31 slidably splined on the counter shaft 18, a clutch drum 32 formed integral with the reduction gear 20 loosely mounted on the counter shaft 18, multiple discs 33 operably engaged with the clutch member 31 and the clutch drum 32 and alternately stacked each other and a spring 34 for slidably urging the clutch member 31 to the left side in FIG. 4 and pressing the multiple clutch discs 33 against each other.

In operation of this side clutch 19, normally, the clutch member 31 is shifted by the spring 34 to press the clutch discs 33 against each other, thereby to transmit power from the clutch member 31 to the clutch drum 32. Further, when a shift fork 35 as a "clutch operating member" pivotally attached to the transmission case 11 is pivotally operated clockwise in FIG. 4, thereby to shift the clutch member 31 to the right side in FIG. 4 against the urging force of the spring 34, the pressed contact among the clutch discs 33 is released, thereby to break the power transmission from the clutch member 31 to the clutch drum 32.

A support shaft 36 for the shift fork (clutch operating member) 35 projects from the rear face of the transmission case 11 and a clutch lever 37 is operably connected to its projecting end. A pair of right and left clutch levers 37 are provided so that these levers may be automatically operated in association with a steering operation of the front wheels. 1. Next, its steering construction will be described.

As shown in FIG. 5, the front wheels 1 are pivotally attached to pivot cases 41 mounted to the right and left ends of the front axle case 8 to be pivotable about a vertical axis (b). Knuckle arms 42 are connected to the upper ends of the right and left pivot cases 41, with the knuckle arms 42 being interconnected via a tie rod 43. On the other hand (on the left side in this FIG. 5), the knuckle arms 42 are operably connected via a drag link 44 also to a pitman arm 45 which is pivotable about a vertical axis (c). This pitman arm 45 is an integral extension of a sector gear 46 acting as an operating member which is displaced in association with a steering operation of the front wheels 1. Further, the sector gear 46 is meshed with a pinion gear 47 which is pivotable by an operation of a steering wheel 48 provided in front of the driver's 13 seat for steering the front wheels 1. This construction constitutes the steering mechanism.

Figure 7:
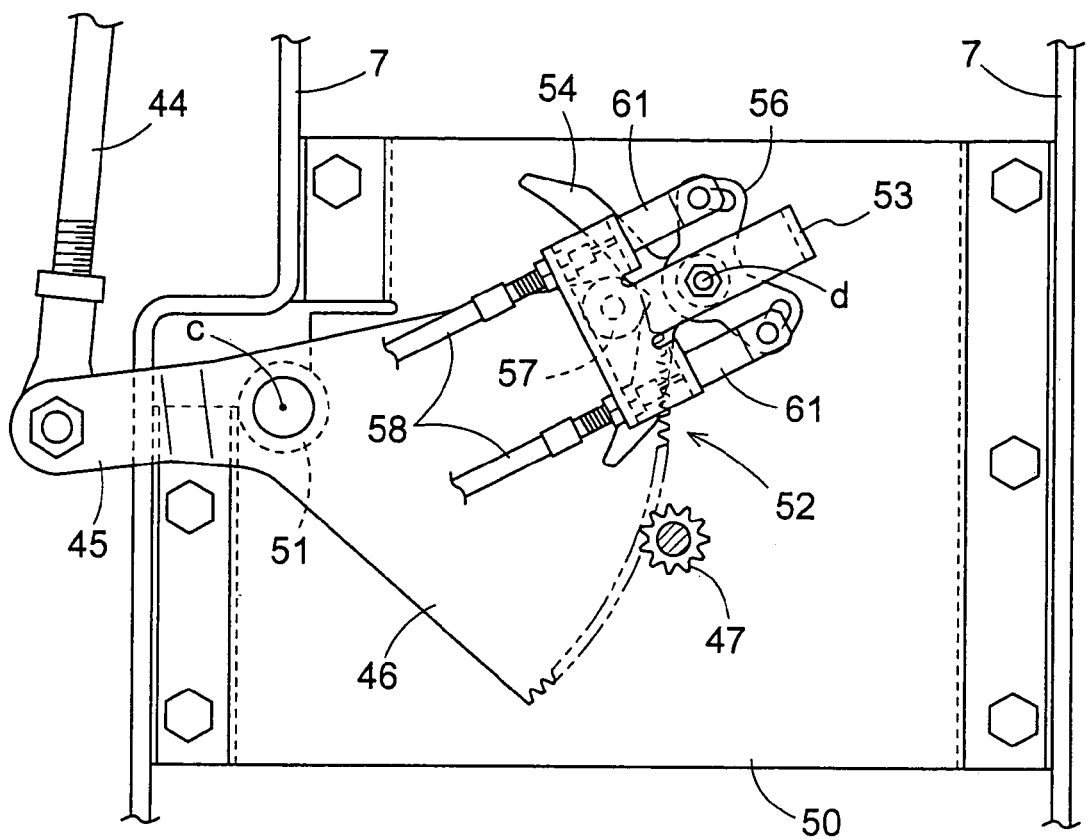
FIG. 7 is a plan view showing a steering operational portion and a cam mechanism.
Figure 8:
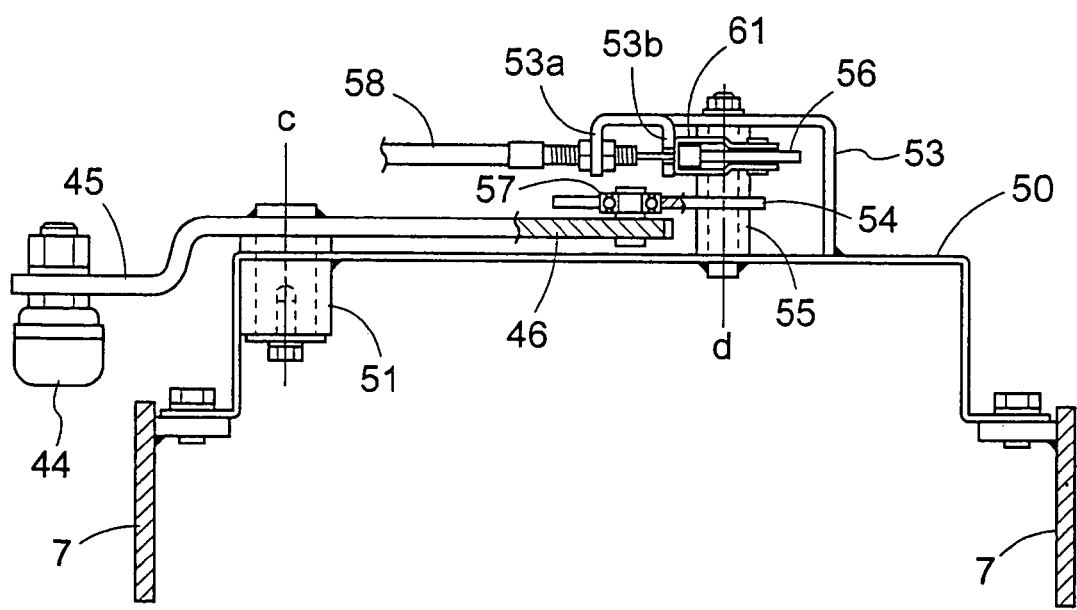
FIG. 8 is a rear view showing the steering operational portion and the cam mechanism.

As shown in FIG. 7 and FIG. 8, the pitman arm 45 and the sector gear 46 are pivotally attached via a boss 51 to a stay 50 extending between the right and left main frames 7 to be pivotable about the vertical axis (c). And, this sector gear 46 is wire-connected to the right and left side clutches 19 via a pivotal cam mechanism 52.

The pivotal cam mechanism 52 includes a pivot arm 54 acting as a "cam follower member" pivotally mounted via a bracket 53 to the top face of the stay 50 to be pivotable about a vertical axis (d), a clutch operating relay member 56 formed integrally with the pivot arm 54 via a boss 55, the sector gear 46 acting as a "cam member", and a roller 57 attached to the sector gear 46 and acting as a "contact member" for acting on the pivot arm 54. To the clutch operating relay member 56, one terminal ends of two release wires 58 are connected and the other terminal ends of the wires 58 are connected to the respective clutch levers 37 for the side clutches 19.

Figure 9:
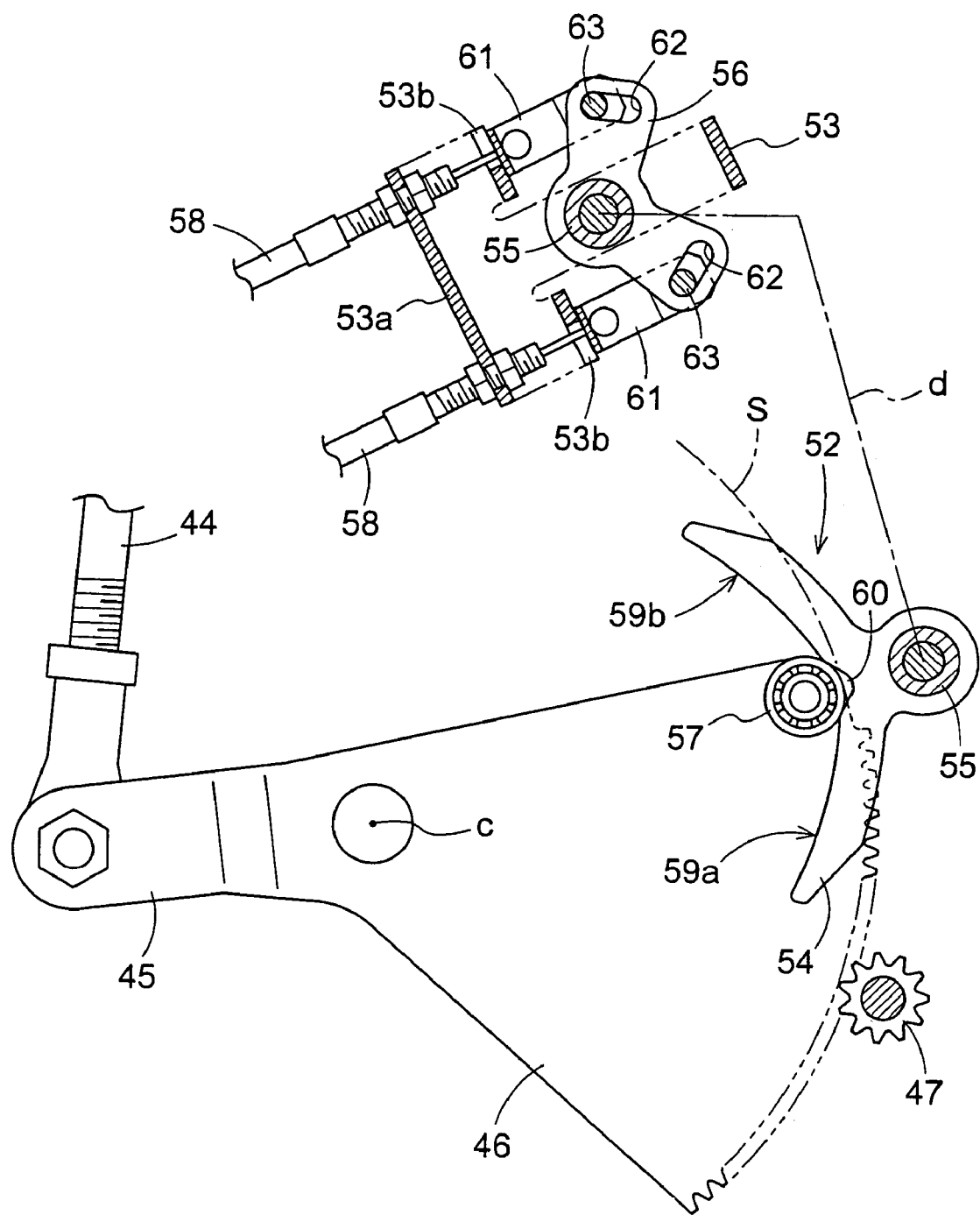
FIG. 9 is a developed plan view showing the cam mechanism under the straight traveling condition.
Figure 10:
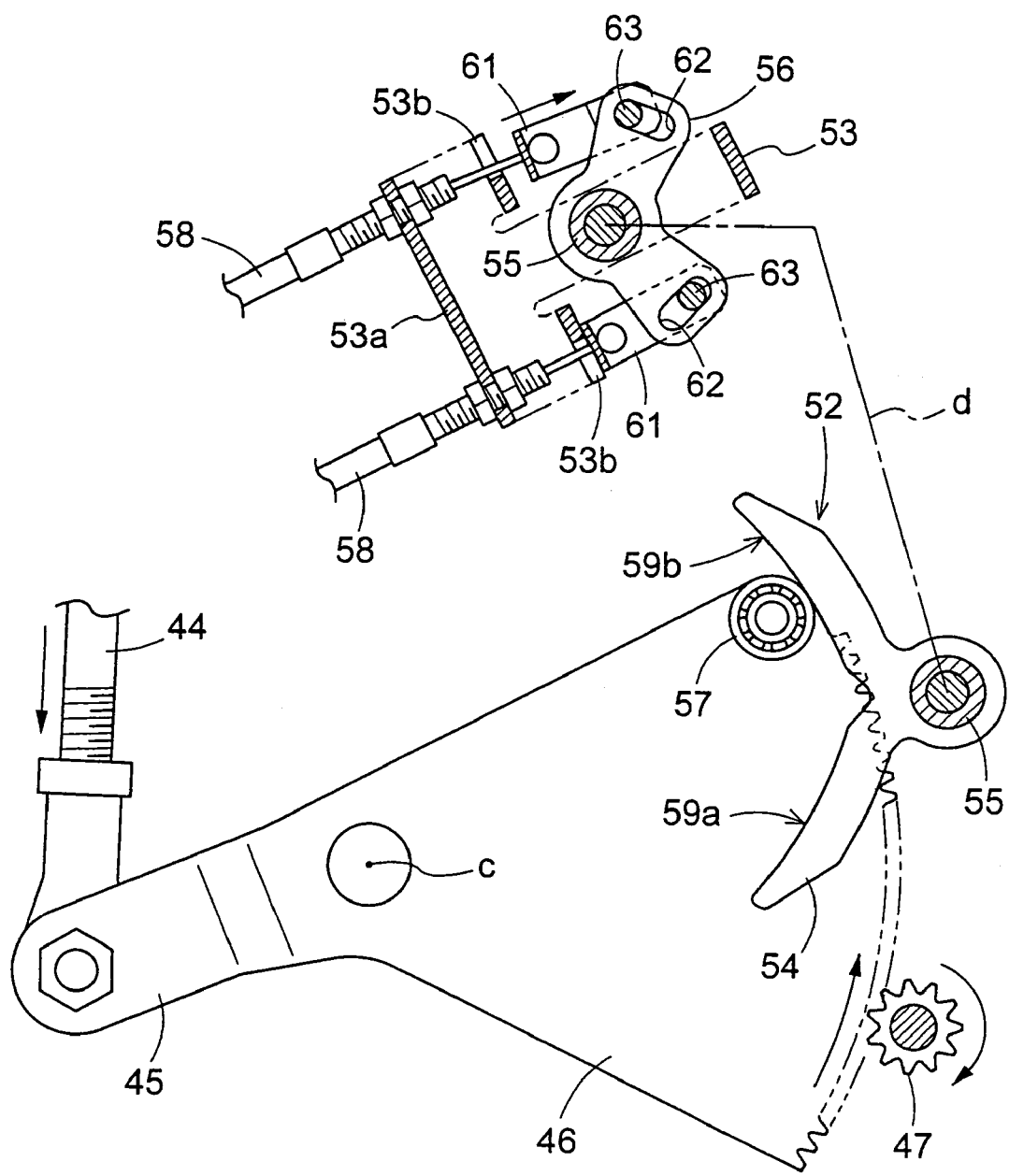
FIG. 10 is a developed plan view showing the cam mechanism under a right steering condition.

As shown in FIG. 9, the pivot arm 54 includes a first arm portion 59a and a second arm portion 59b opposed to each other and "fanned out" away from each other toward the roller 57. In operation, when the sector gear 46 is under a straight traveling condition, the roller 57 is retained in a stable manner as being dropped into and snugly retained within a neutral recess 60 formed between the first arm portion 59a and the second arm portion 59b. As shown in FIG. 10, when the sector gear 46 is pivoted counter-clockwise in the figure thereby to steer the front wheels 1 to the right from the straight traveling condition, the roller 57 presses the second arm portion 59b, whereby the pivot arm 54 is pivoted clockwise and the clutch operating relay member 56 pivotable therewith is pivoted in the same direction. In association therewith, one release wire 58 is pulled, so that only the clutch lever 37 for the right rear wheel 2 located on the inner side of that turn is operated in the clutch disengaging direction.

Further, though not shown, when the sector gear 46 is pivoted clockwise in the figure thereby to steer the front wheels 1 to the left from the straight traveling condition, the roller 57 presses, this time, the first arm portion 59a, whereby the pivot arm 54 is pivoted counter-clockwise and the clutch operating relay member 56 pivotable therewith is pivoted in the same direction. In association therewith, the other release wire 58 is pulled, so that only the clutch lever 37 for the left rear wheel 2 located on the inner side of the turn is operated in the clutch disengaging direction.

Figure 6:
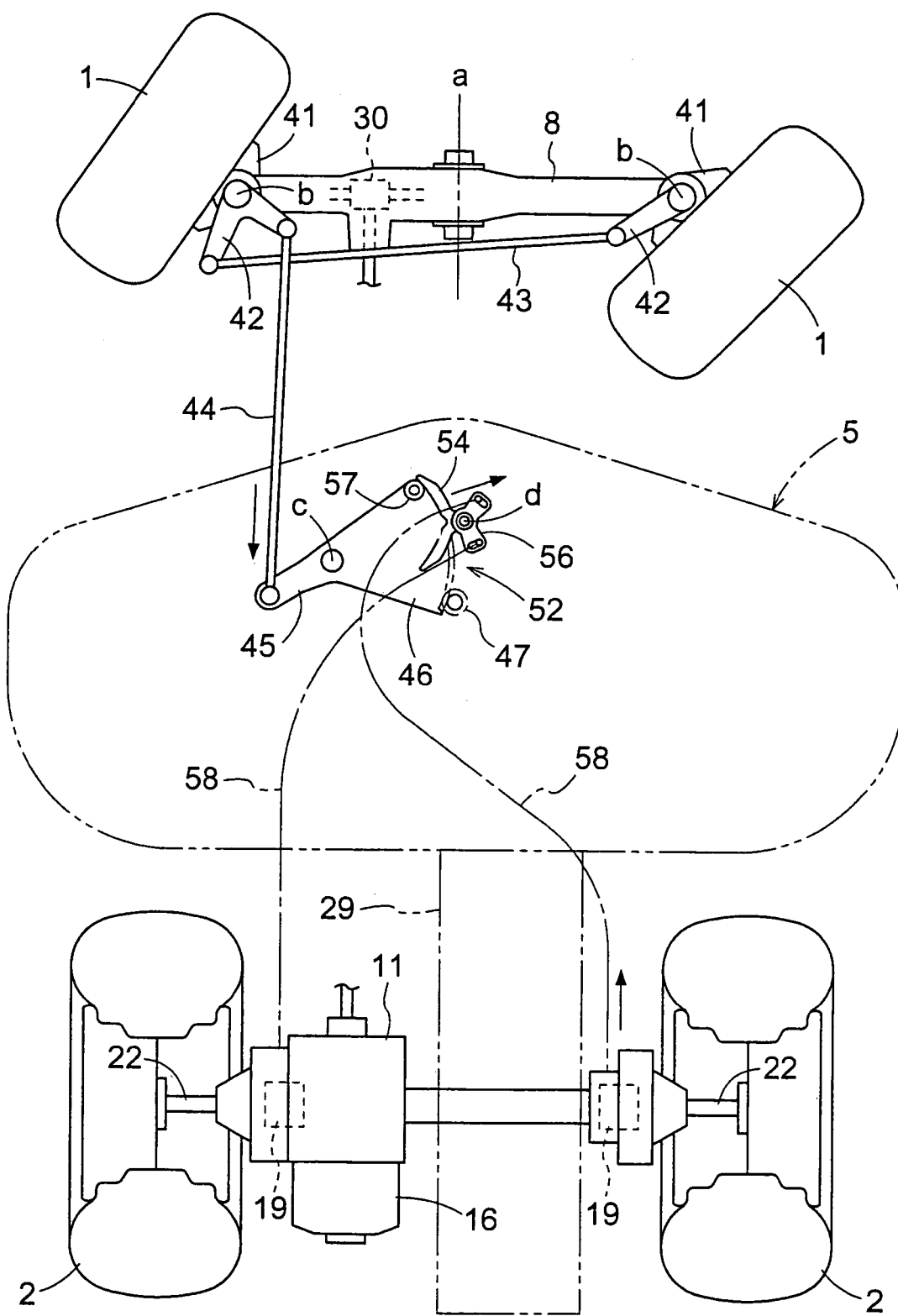
FIG. 6 is a plan view showing the steering construction under a right steering condition.

In the above, each of the first arm portion 59a and the second arm portion 59b forms an arc (or arcuate face) having a substantially same curvature as a moving path S of the outer peripheral end of the roller 57 when this roller rotates and revolves about the vertical axis (c) in association with a pivotal movement of the sector gear 46. For instance, as shown in FIG. 6 and FIG. 10, under the right steering condition wherein the roller 57 has moved past the neutral recess 60 to press the second arm portion 59b, this pushed and displaced second arm portion 59b is in agreement with the moving path S of the outer peripheral end of the roller 57. So that, even when the roller 57 is further moved in the same direction by a subsequent further steering operation in the same direction, this will not result in any further displacement of the pivot arm 54.

More particularly, when the sector gear 46 is pivoted by an angle greater than a predetermined angle thereby to steer the front wheels 1 by an angle greater than a predetermined angle (e.g. 20 degrees) from the straight traveling condition, the clutch lever 37 for the one rear wheel 2 located on the inner side of the turn will be pivoted just by an amount needed for its clutch disengagement. And, any subsequent further steering operation in the same direction will not pivot the clutch lever 37 any further in the clutch disengaging direction.

Incidentally, a front end of an outer sheath of each release wire 58 is supported by a wire receiving portion 53a formed continuously from the bracket 53 and a front end metal element 61 attached to the front end of the inner wire is connected through a slot 62 (play means) and a connecting pin 63 to the clutch operating relay member 56. Further, under the clutch engaged condition, the front end metal element 61 is received by the front face of a contact portion 53b formed continuously from the bracket 53. When the clutch operating relay member 56 is pivoted to pull one release wire 58 in the clutch disengaging direction, the connecting pin 63 of the other release wire 58 not being pulled can move reliably within the slot 62 to provide a "stroke absorbing" function.

Further, as shown in FIG. 4, to an extension of the clutch lever 37, there is attached a wire tightening spring 64 for slightly urging this clutch lever 37 to the clutch engaging (ON) side.

A second embodiment of the invention will be described next with reference to FIGS. 12 through 17.

Figure 12:
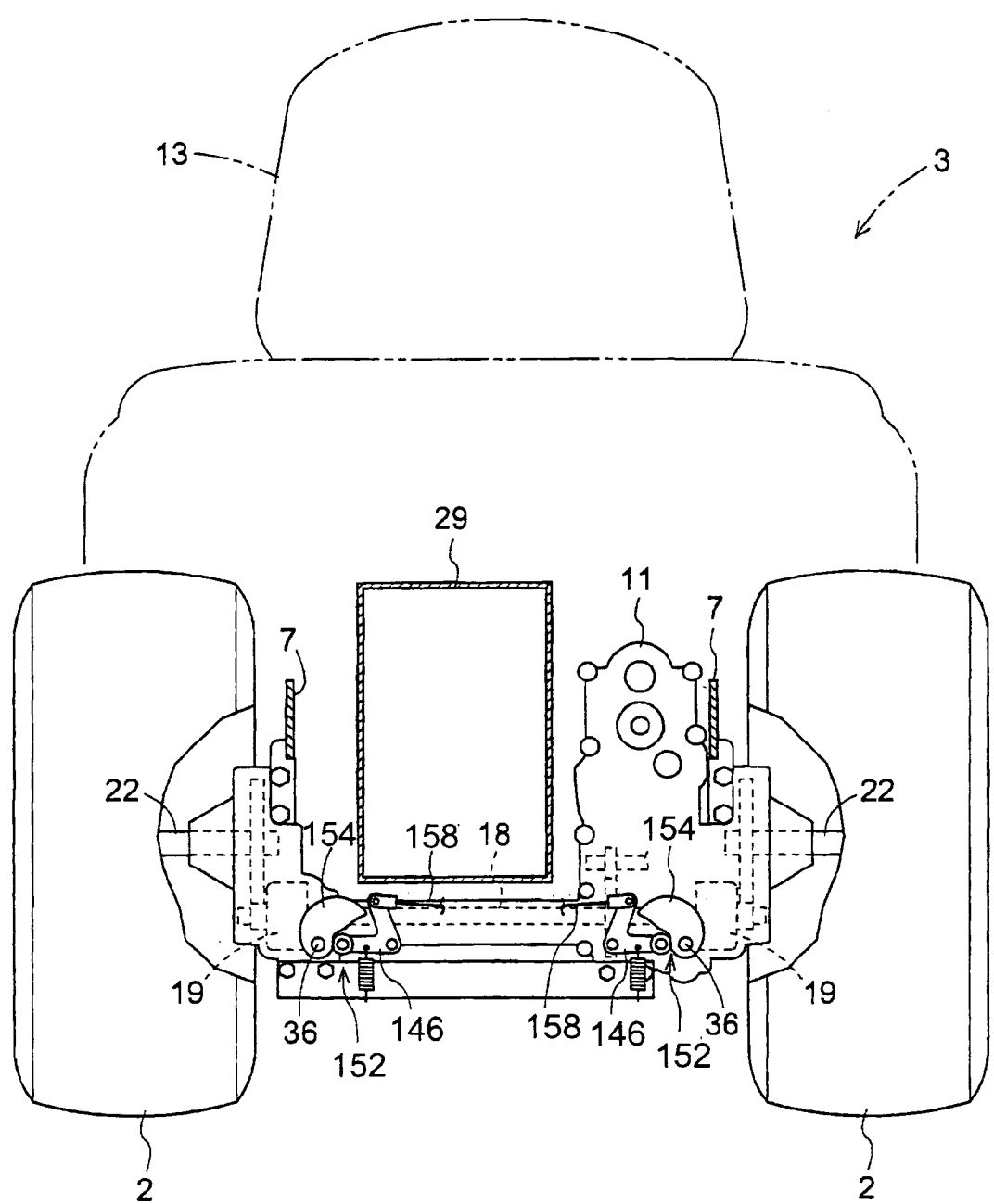
FIG. 12 is a front view showing a rear transmission unit relating to a second embodiment.
Figure 13:
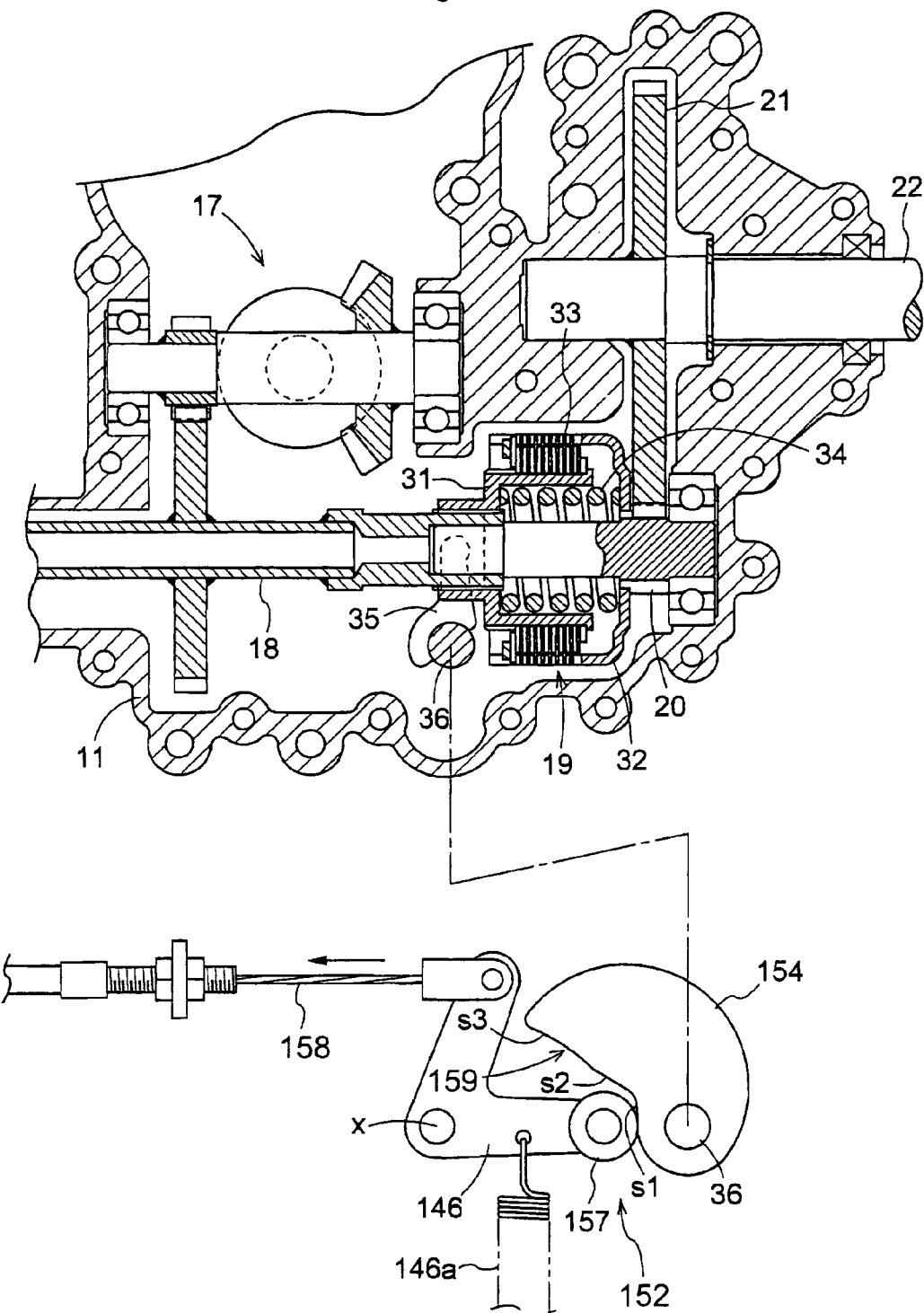
FIG. 13 is a front view showing a left side clutch and its operational construction relating to the second embodiment.

As may be apparent from FIGS. 12 and 13, the front face of the transmission case 11 supports the operational shaft 36 extending therethrough in the fore and aft direction. To the end of this operational shaft 36 located inside the case 11, the clutch operating member 35 is fixedly attached. Further, a pivotal cam mechanism 152 for pivotally operating the operational shaft 36 is attached to the front face of the transmission case 11. This pivotal cam mechanism 152 consists essentially of a pivotal cam plate 154 fixedly connected to the outer end of the operational shaft 36 projecting from the case 11 and a bell-crank like pivot member 146 pivotally supported to the front face of the transmission case 11 to be pivotable about a fore and aft axis (x). In operation, when the pivotal member 146 is pivoted, the roller 157 attached to the leading end thereof comes into contact with the cam face 159 formed in the outer periphery of the pivotal cam plate 154, which cam function causes a pivotal displacement of the pivotal cam plate 154 through its contact therewith. Further, this cam face 159 includes, in continuous series, an arcuate stable cam face portion s1 for retaining the clutch engaging position, a ride-over (or operative) cam face portion s2 for clutch disengaging operation and an arcuate stable cam face portion s3 for retaining the clutch disengaging position.

And, the pivot members 146 of the right and left pivotal cam mechanisms 152 provided in correspondence to the right and left side clutches 19 are operably coupled to the steering mechanism 40 in the manner described below, so that the right and left pivot cam mechanisms 152 are automatically operated in association with a steering operation of the front wheels 1.

Figure 14:
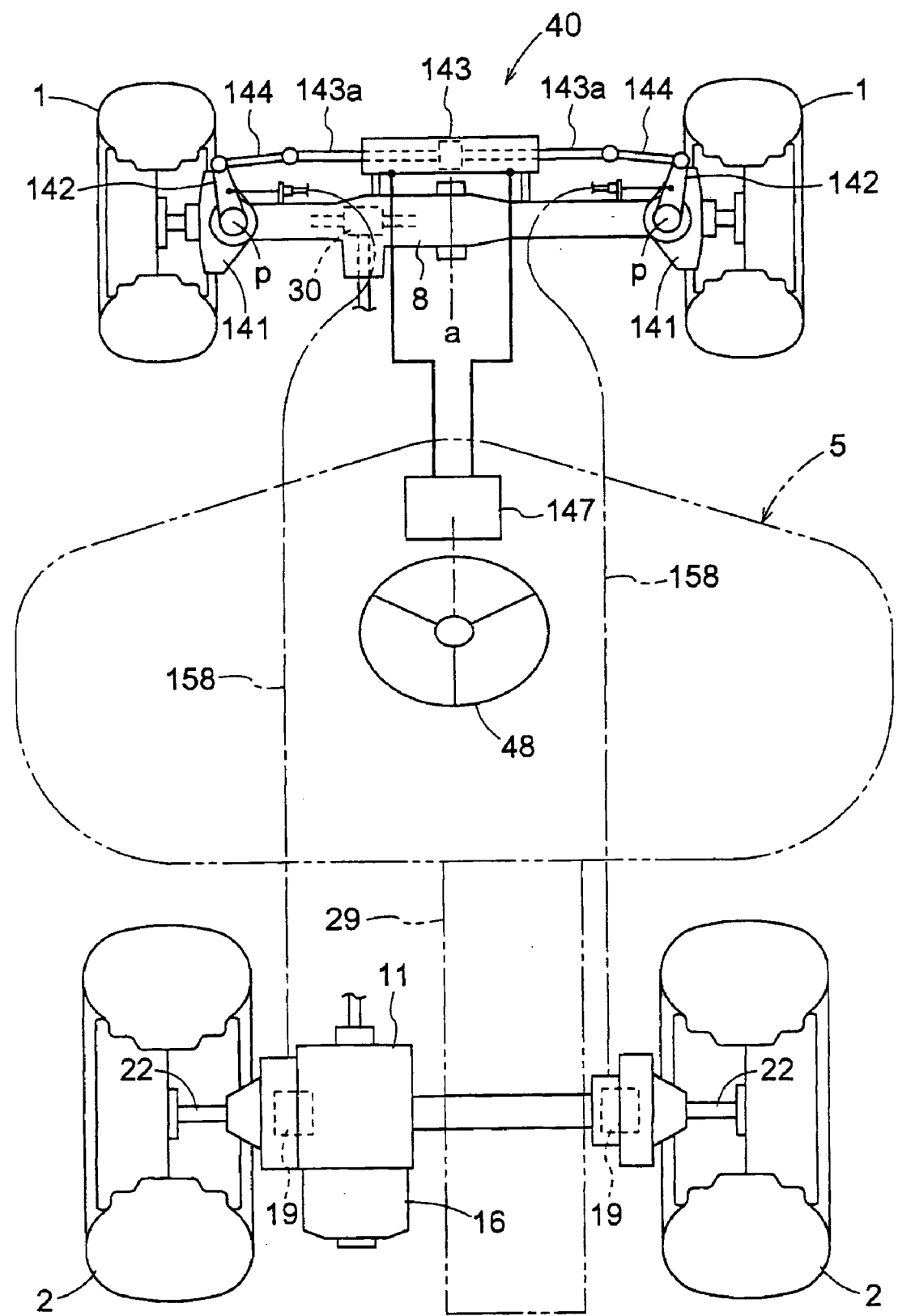
FIG. 14 is a plan view showing a steering construction relating to the second embodiment under a straight traveling condition.

As shown in FIG. 14, in this embodiment, the steering mechanism 40 comprises a full hydraulic power-steering mechanism. Namely, the front wheels are supported to pivot cases 141 attached to the right and left opposed ends of the front axle case 8 to be pivotable about vertical axes (p). Knuckle arms 142 connected to upper ends of the right and left pivot cases 141 are connected via tie rods 144 to piston rods 143a of a double rod type steering cylinder 143 horizontally mounted across the front axle case 8. And, the steering cylinder 143 is pipe-connected to a control unit 147 which in turn is operated by the steering wheel 48. In operation, as the steering wheel 48 is turned to hydraulically activate the steering cylinder 143, the front wheels 1 are steered in the turning direction of the steering wheel.

The right knuckle arm 142 and the pivot member 146 of the right pivot cam mechanism 152 are operably coupled to each other via a release wire 158. Similarly the left knuckle arm 142 and the pivot member 146 of the left pivotal cam mechanism 152 are operably coupled to each other via a release wire 158. In operation, when the front wheels 1 are steered to the right from the straight traveling condition, the right knuckle arm 142 pulls the release wire 158 and also the release wire 158 connected to the left knuckle arm 142 is loosened. Conversely, when the front wheels 1 are steered to the left from the straight traveling condition, the left knuckle arm 142 pulls the release wire 158 and also the release wire 158 connected to the right knuckle arm 142 is loosened. Further, the pivot member 146 of each pivotal cam mechanism 152 mounts a return spring 146a for pivotally urging toward the clutch engaged position.

With the above-described construction, in association with a steering operation of the front wheels 1, the respective side clutches 19 are automatically operated via the right and left pivotal cam mechanisms 152 in the manner described below.

When the front wheels 1 are under the straight traveling condition or are steered to the right or the left therefrom by an angle short of a predetermined set angle (e.g. 20 degrees), even when the rollers 157 move along the respective arcuate paths in association with pivotal movements of the pivot members 146, the rollers 157 only move along the stable cam face portions s1 formed in the cam faces 159 of the pivotal cam plates 154 for retaining the clutch engaged position, and the pivotal cam plates 154 are maintained at the "clutch engaging" position. Therefore, under the straight traveling condition or during a gentle steering operation, both of the right and left side clutches 19 are maintained at the "clutch engaging" condition, so that the vehicle travels under the four-wheel drive mode.

Figure 15:
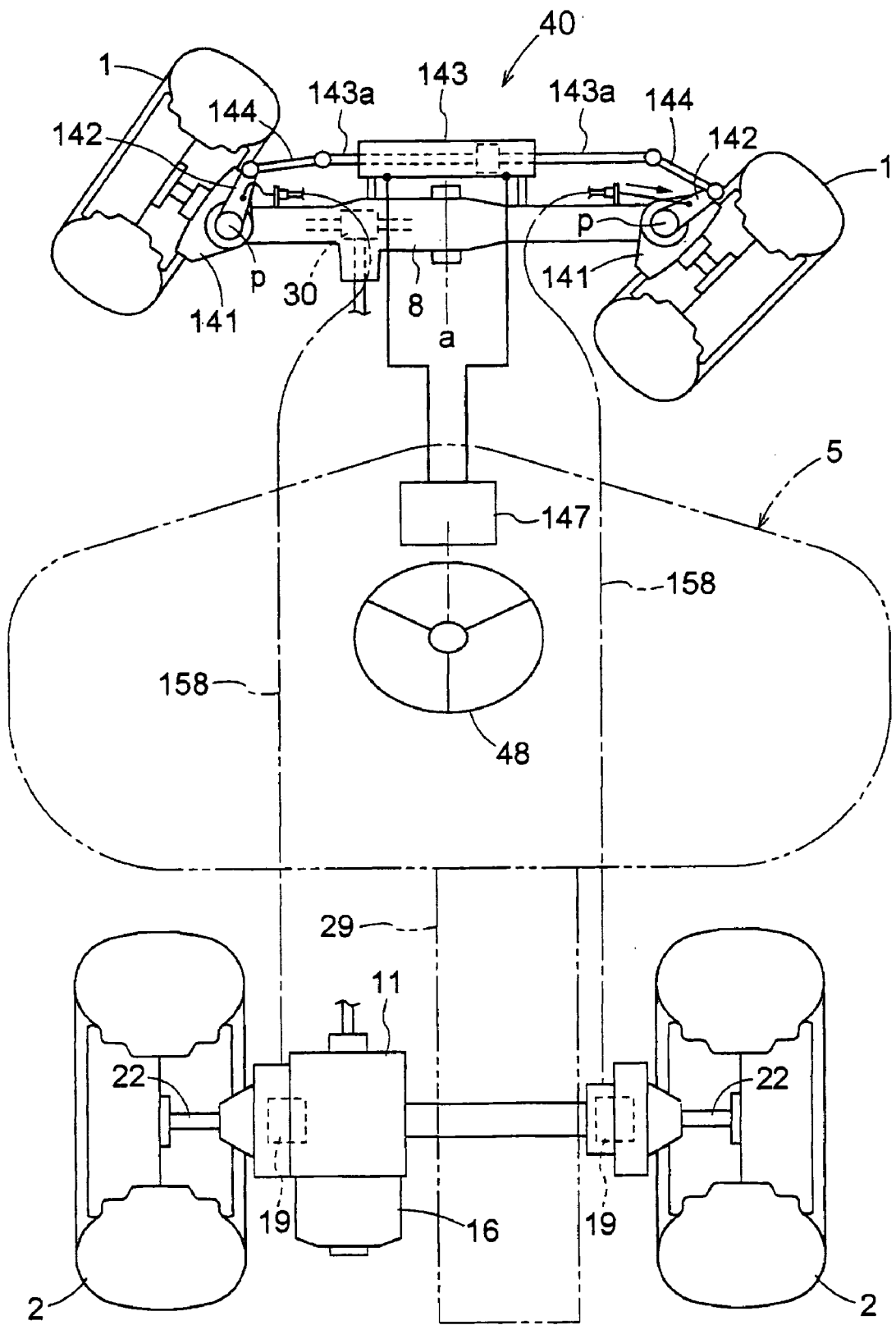
FIG. 15 is a plan view showing the steering construction relating to the second embodiment under a right steering condition.

And, as shown in FIG. 15 for instance, when the front wheels 1 are steered sharply from the straight traveling condition by an angle greater than the predetermined set angle, only the pivot member 146 of the right pivotal cam mechanism 152 on the inner side of this turn is pivoted counter-clockwise by the release wire 158, so that its roller 157 comes into contact with the ride-over (or operative) cam face portion s2 subsequent to the stable cam face portion s1, so that the right side clutch 19 is disengaged against the urging force of the return spring 146a. As a result, the vehicle effects a small-radius (sharp) turn to the right under the three-wheel drive mode involving the steered right and left front wheels 1 and the left rear wheel 2 on the outer side of the turn.

Figure 16:
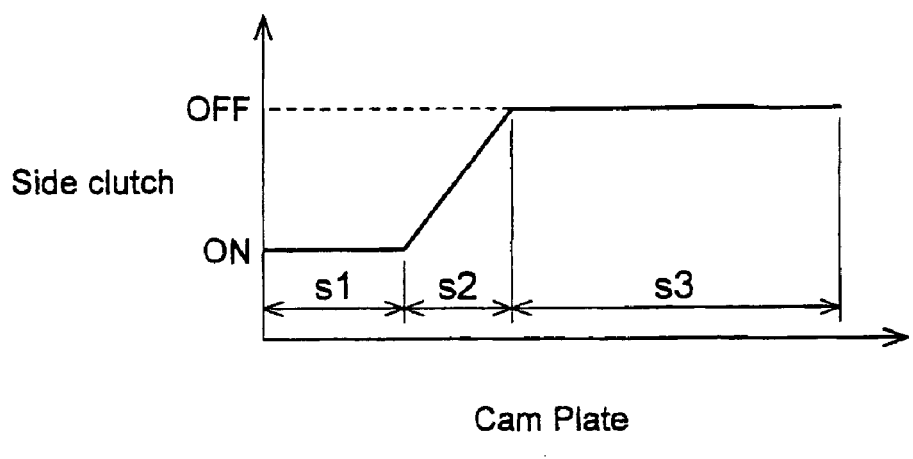
FIG. 16 is a graph showing relationship between a pivot amount of a pivotal cam plate and an operation of a side clutch relating to the second embodiment.

After the side clutch 19 is disengaged, if the front wheels 1 are further steered to the right, the pivot member 146 too is pivoted counter-clockwise. In this case, however, the roller 157 moves only along the clutch disengaging position retaining stable cam face portion s3 formed in the cam face 159 of the pivotal cam plate 154, so that the pivotal cam plate 154, so that the pivotal cam plate 154 is maintained at the "clutch disengaging" position. Incidentally, the relationship between the operation of the pivot member 146 and the pivotal movement amount of the pivotal cam plate 154 is as illustrated in FIG. 16.

Further, though not shown, when the front wheels 1 are sharply steered to the left from the straight traveling condition by an angle greater than the predetermined set angle, the left pivotal cam mechanism 152 functions just like the manner described above, so that only the left side clutch 19 on the inner side of the turn is automatically disengaged.

Figure 11:
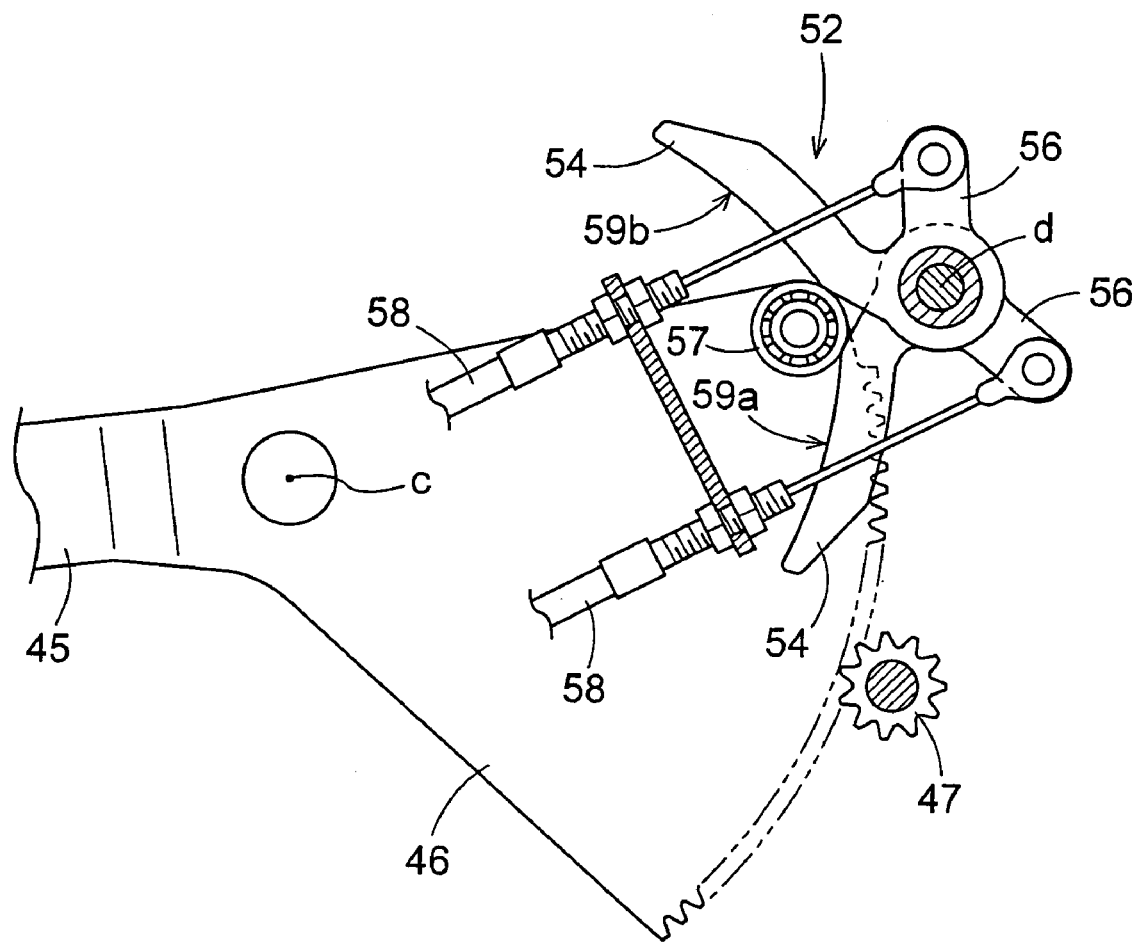
FIG. 11 is a plan view showing a variation of the cam mechanism.

Variations (1) As shown in FIG. 11, the clutch operating relay member 56 and the pivot arm 54 may be wire-connected to the right and left clutch levers 37 and may be provided as a pair for the right and left to be independent of each other. This eliminates the above-described loose interconnection by the slot 62 between the clutch operating relay member 56 and the release wire 58.

(2) In the foregoing embodiment, the clutch operating relay member 56 and the clutch lever 37 are wire-connected. Instead, a connecting rod may be used in place of the release wire 58.

(3) In the foregoing embodiment, the pivotal cam mechanism 52 is constructed such that the sector gear 46 as an example of operating member which is displaced in association with a steering operation of the front wheels 1 includes the roller (contact member) 57 which comes into contact with the pivot arm 54 and pushes this. Instead, the pivot arm 54 may be provided to the sector gear 46 (or the pitman arm 45) and the clutch operating relay member 56 may be provided to the roller (contact member) 57.

(4) In the case of a construction using a steering mechanism of another type in which the front wheels 1 are steered by means of a linearly displaceable operational member by using a pinion gear in combination with a rack rather than the sector gear, it is possible to convert the linear movement of the roller (contact member) through the pivotal cam mechanism 52 into a predetermined amount of displacement (pivotal or linear displacement) of the clutch operating relay member 56.

Figure 17:
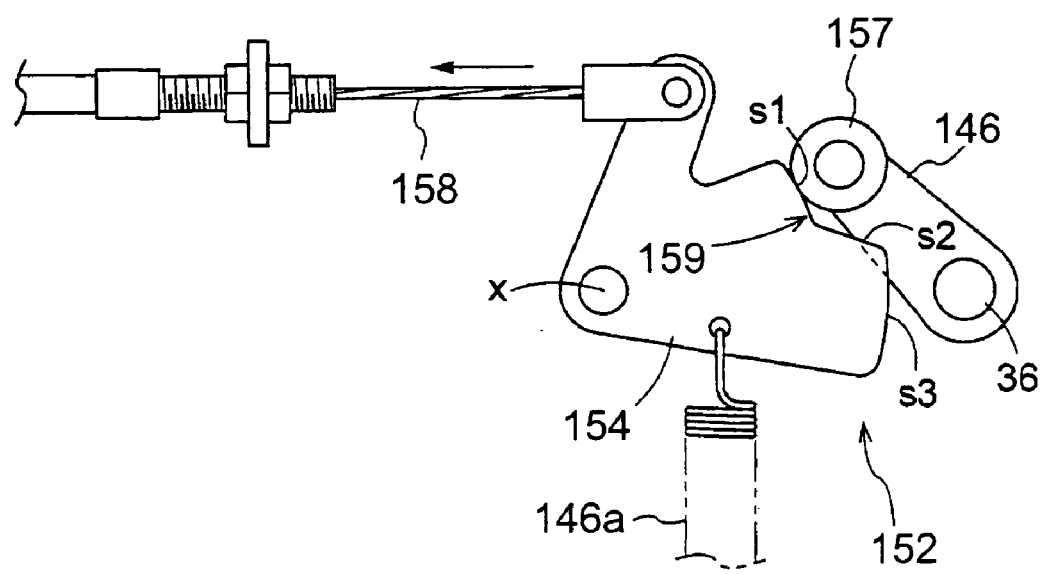
FIG. 17 is a front view showing a variation of a pivotal cam mechanism relating to the second embodiment.

(5) As shown in FIG. 17, the pivotal cam plate 154 of the pivotal cam mechanism 152 may be wire-connected to the steering link mechanism 40 and the pivot member 146 may be connected to the outer end of the operational shaft 36.

(6) Instead of connecting the steering mechanism 40 and the pivotal cam mechanism 152 by using the release wire 158, a push-pull rod or a link mechanism can be used in place of the release wire 158.

The present invention can apply also to a four-wheel drive work vehicle having steerable rear wheels and non-steerable front wheels. Further, the invention may be used not only in the lawn mower vehicle, but also in other types of work vehicle such as an agricultural tractor, a rice planter work vehicle, etc.

The present invention may be embodied in any other manner than described above. Various modifications thereof will be apparent to those skilled in the art, without departing the essential features thereof defined in the appended claims.

The invention claimed is:

1. A four-wheel drive work vehicle comprising:
an engine;
a pair of right and left steerable wheels rotatably driven by receiving power from the engine via a differential mechanism;
a pair of right and left non-steerable wheels rotatably driven by receiving power from the engine via right and left side clutches;
a displacement converter mechanism for converting a steered displacement of the steerable wheels into a different mode of displacement; and
a clutch operating member for operating one of the side clutches based on said different mode displacement converted by the displacement converter mechanism;
wherein said displacement converter mechanism comprises a pivotal cam mechanism including a cam member which is displaced based on said steered displacement and a cam follower member operably associated with said cam member; and
for a vehicle turn, said clutch operating member is displaced via said pivotal cam mechanism by a predetermined amount in response to a steering operation of the steerable wheels by an angle exceeding a predetermined angle from a straight traveling condition and wherein, in association with said displacement of the clutch operating member by said predetermined amount, said one side clutch for one of the non-steerable wheels located on the inner side of said vehicle turn is automatically disengaged against an engaging urging force, wherein the cam follower has an operative cam face portion for contacting the cam member to move the cam follower in order to disengage said one side clutch and a stable cam face portion for maintaining the side clutch at a predetermined clutch disengaging condition during a further steering operation of the steerable wheels after the clutch disengagement.

2. The four-wheel drive work vehicle according to claim 1, wherein said cam member of the pivotal cam mechanism comprises a sector gear pivotable back and forth in response to a steering operation of a steering wheel, said cam follower member of the pivotal cam mechanism comprises a pivot arm which comes into contact with a contact member provided to said sector gear, and said pivot arm includes a first arm portion operable by said contact member in response to a steering operation to the left and a second arm portion operable by said contact member in response to a steering operation to the right.

3. The four-wheel drive work vehicle according to claim 2, wherein the first arm portion and the second arm portion are formed integral.

4. The four-wheel drive work vehicle according to claim 2, wherein the first arm portion and the second arm portion are configured to be displaced independently of each other.

5. The four-wheel drive work vehicle according to claim 1, wherein said cam follower member of the pivotal cam mechanism comprises a pivotal cam plate having a cam face including said operative cam face portion and said stable cam face in its outer periphery,
said cam member of the pivotal cam mechanism comprises a pivot member which comes into contact with said cam face, and
said pivotal cam mechanism is incorporated in a transmission case accommodating said side clutches.

6. The four-wheel drive work vehicle according to claim 5, wherein the pivotal cam plate of the pivotal cam mechanism is attached to a portion of an operational shaft attached to and extending through said transmission case,
said shaft portion projecting from the case and said clutch operating member is attached to a further portion of the shaft disposed inside the transmission case.

7. The four-wheel drive work vehicle according to claim 6, wherein the operational shaft is attached to the transmission case such that the shaft extends through the case in the fore and aft direction.

8. The four-wheel drive work vehicle according to claim 1, wherein the steered displacement of the steerable wheels is transmitted via a wire to said pivotal cam mechanism.

9. The four-wheel drive work vehicle according to claim 1, wherein a mower implement is mounted between the steerable wheels and the non-steerable wheels to be lifted up and down.

10. A four-wheel drive work vehicle comprising:
an engine;
a pair of right and left steerable wheels rotatably driven by receiving power from the engine via a differential mechanism;
a pair of right and left non-steerable wheels rotatably driven by receiving power from the engine via right and left side clutches;
a displacement converter mechanism for converting a steered displacement of the steerable wheels into a different mode of displacement; and
a clutch operating member for operating one of the side clutches based on said different mode displacement converted by the displacement converter mechanism;
wherein said displacement converter mechanism comprises a pivotal cam mechanism including a cam member which is displaced based on said steered displacement and a cam follower member operably associated with said cam member; and
for a vehicle turn, said clutch operating member is displaced via said pivotal cam mechanism by a predetermined amount in response to a steering operation of the steerable wheels by an angle exceeding a predetermined angle from a straight traveling condition and in association with said displacement of the clutch operating member by said predetermined amount, said one side clutch for one of the non-steerable wheels located on the inner side of said vehicle turn is automatically disengaged against an engaging urging force,
wherein said cam follower member of the pivotal cam mechanism comprises a pivotal cam plate having a cam face in its outer periphery, said cam member of the pivotal cam mechanism comprises a pivot member which comes into contact with said cam face, and
said pivotal cam mechanism is incorporated in a transmission case accommodating said side clutches.

11. The four-wheel drive work vehicle according to claim 10, wherein the pivotal cam plate of the pivotal cam mechanism is attached to a portion of an operational shaft attached to and extending through said transmission case,
said shaft portion projecting from the case, and
said clutch operating member is attached to a further portion of the shaft disposed inside the transmission case.

12. The four-wheel drive work vehicle according to claim 10, wherein said pivotal cam plate includes a stable cam face portion formed in the cam face for maintaining the side clutch at a predetermined clutch disengaging condition in response to a further steering operation of the steerable wheels after the clutch disengagement.

13. The four-wheel drive work vehicle according to claim 11, wherein the operational shaft is attached to the transmission case such that the shaft extends through the case in the fore and aft direction.

14. The four-wheel drive work vehicle according to claim 10, wherein the steered displacement of the steerable wheels is transmitted via a wire to said pivotal cam mechanism.

15. The four-wheel drive work vehicle according to claim 10, wherein a mower implement is mounted between the steerable wheels and the non-steerable wheels to be lifted up and down.

* * * * *